United States Patent
Schwarz et al.

(10) Patent No.: US 8,205,427 B2
(45) Date of Patent: Jun. 26, 2012

(54) INTERDEPENDENT LUBRICATION SYSTEMS IN A TURBINE ENGINE

(75) Inventors: Frederick W. Schwarz, Glastonbury, CT (US); Jorn A. Glahn, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 738 days.

(21) Appl. No.: 11/595,185

(22) Filed: Nov. 9, 2006

(65) Prior Publication Data
US 2008/0110596 A1  May 15, 2008

(51) Int. Cl.
*F02M 31/10* (2006.01)
*F02G 5/00* (2006.01)
*F02C 7/06* (2006.01)
*F02C 7/224* (2006.01)
*F28F 27/02* (2006.01)

(52) U.S. Cl. .......... 60/39.08; 60/39.83; 60/736; 165/41; 165/51; 184/6.11; 184/6.22

(58) Field of Classification Search .......... 60/39.08, 60/39.83, 736; 165/203, 41, 51; 184/6.11, 184/6.22, 104.3
See application file for complete search history.

(56) References Cited

U.S. PATENT DOCUMENTS

| | | | | |
|---|---|---|---|---|
| 4,741,152 | A * | 5/1988 | Burr et al. | 60/39.08 |
| 4,916,902 | A * | 4/1990 | Pratt et al. | 60/599 |
| 5,438,823 | A * | 8/1995 | Loxley et al. | 60/39.08 |
| 5,615,547 | A * | 4/1997 | Beutin et al. | 60/39.08 |
| 6,216,477 | B1 * | 4/2001 | Dienhart et al. | 62/217 |
| 2004/0194949 | A1 * | 10/2004 | Ban et al. | 165/287 |

FOREIGN PATENT DOCUMENTS

| | | |
|---|---|---|
| EP | 0721061 A1 | 7/1996 |
| EP | 1329617 A2 | 7/2008 |
| GB | 1069677 | 7/1963 |

OTHER PUBLICATIONS

Official Search Report of the European Patent Office in counterpart Foreign Application No. 07254416 filed Nov. 9, 2007.

* cited by examiner

*Primary Examiner* — John Ford
(74) *Attorney, Agent, or Firm* — Kinney & Lange, P.A.

(57) ABSTRACT

A heat exchange system for use in operating equipment having a plurality of subsystems in each of which one of a plurality of working fluids is utilized to provide selected operations with there being an air and working fluid heat exchanger providing controlled cooling to cool at least one of the plurality of working fluids in its corresponding subsystem. In addition, a coupling heat exchanger is also provided connected to two of the subsystems to pass there working fluids therethrough, including the subsystem with the air and working fluid heat exchanger, to allow one of the connected subsystems to aid in cooling the other.

19 Claims, 7 Drawing Sheets

INTERDEPENDENT LUBRICATION SYSTEMS IN A TURBINE ENGINE

BACKGROUND OF THE INVENTION

The present invention relates to lubrication systems for turbine engines and for associated integrated drive electrical power generator systems and, more particularly, to various outside fluid and lubricant heat exchangers for use in maintaining desired temperatures of the lubricants in such engines and systems.

Lubrication systems for turbine engines and associated equipment, such as a turbofan engine and an associated integrated drive electrical power generator, provide pressurized lubricant, an oil, to lubricate, cool and clean the engine main bearings, gearbox gears, and the like. Similarly, pressurized oil is used for the lubrication of bearings and other parts in an associated integrated drive generator system. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing in evolving engines and associated systems because of the use of larger electrical generators, for instance, in aircraft turbine engines due to increasing consumption of electrical power in the aircraft powered thereby, and because of the advances in aircraft turbine engines such as the use of geared turbofans for such aircraft with large fan-drive gearboxes. Despite the added heat generated by the such modified and expanded equipment, the necessary lubricating oil operating temperature ranges to provide satisfactory lubricating performance have not changed for the most part and, in some instances, the upper operating temperature limits have been reduced.

The lubrication system for a turbofan engine in an aircraft typically has a first heat exchanger providing lubricating oil passing through passageways in that heat exchanger that is cooled by the fuel stream flowing past these passageways. This arrangement permits the lubricating oil to reject heat therein to the fuel being burned by the engine thereby heating that fuel to help recover some of the energy lost in the combustor of the engine.

Because, in some flight situations, more heat is generated in the lubricating oil than is needed for warming the fuel, a portion of the lubricating oil can be forced to bypass the heat exchanger for the fuel and the lubricating oil, and the oil can be directed to a further heat exchanger where the heat therein is transferred to the air in the secondary airstream provided by the fan of the turbofan engine. In a typical arrangement, a duct is provided in the fan cowling through which a portion of the airstream is diverted, or, more recently, provided in a fan duct bifurcation structure, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the air can again be forced to bypass this air and lubricating oil heat exchanger.

An integrated drive generator system that is powered by the associated turbofan engine also has a lubrication system in which the oil used as a lubricant therein is forced by a pump through a heat exchanger where the heat therein is transferred to the air in the secondary airstream provided by the fan of the turbofan engine. Here, too, a duct is typically provided in the generator structure through which a portion of the airstream is diverted with the generator air and lubricating oil heat exchanger placed therein so that the lubricating oil passing through passageways in that heat exchanger is cooled by the duct airstream flowing past these passageways in the exchanger.

Any of the fan airstream that is diverted to pass through the lubricating oil and air heat exchangers in such duct systems may be regulated by some air valve or stream limiting door in the duct containing the exchanger, and the exchanger must be large enough, insofar as assuring that a sufficient part of the cooling engine fan airstream flows over a sufficient amount of lubricating oil flowing in passageways therein, to provide adequate oil cooling for the most extreme preflight or flight conditions encountered, or both. This is true even though this heat exchanger size is not needed for many, or even most, of these preflight or flight conditions. Such a larger sized exchanger correspondingly requires larger fairings about that exchanger leading to a) possible detachment of the fan streams therefrom and the resulting vortex losses absent further preventive measures, b) a larger inlet to the duct possibly resulting in the "spilling" out of incoming air and the accompanying eddy and mixing losses, and to c) a larger range of required motion for the required larger size duct outlet flaps possibly leading to this flap interfering more with the fan airstream passing the outside of the flap when in the range of being nearly fully open to being fully closed. These three consequences, even in an optimally configured arrangement, will result in pressure losses. Thus, such an air and lubricating oil heat exchanger duct based system continually leads to thrust losses in the turbofan engine despite being unnecessary for cooling the lubricating oil in many flight situations. Hence, there is a strong desire for a lubricating oil thermal management system to control fuel and oil temperatures that also reduces such thrust losses and additionally reduces the volume required therefor in the more compact available spaces in advanced turbofan engines and associated equipment arrangements.

BRIEF SUMMARY OF THE INVENTION

The present invention provides a heat exchange system for use in operating equipment having a plurality of subsystems in each of which a corresponding one of a plurality of working fluids is utilized to provide selected operations in that subsystem with the heat exchange system providing air and working fluid heat exchanges to cool at least that working fluid utilized in its corresponding subsystem at selectively variable rates in airstreams occurring with uses of the operating equipment. The system has an airstream heat exchanger that is connected in an air cooled one of the plurality of subsystems to have the working fluid utilized therein pass therethrough to cool that working fluid at selectively variable rates in the airstreams passing thereby. A coupling heat exchanger is connected in both the air cooled one of the plurality of subsystems and another of the plurality of subsystems as a coupled subsystem to have the corresponding working fluid utilized in each of the air cooled and coupled subsystems pass therethrough to permit one of these subsystems to cool the other. A control system operates the coupling heat exchanger to determine the amount of heat exchanged therein between the air cooled subsystem and the coupled subsystem working fluids.

DETAILED DESCRIPTION

Figure 1:
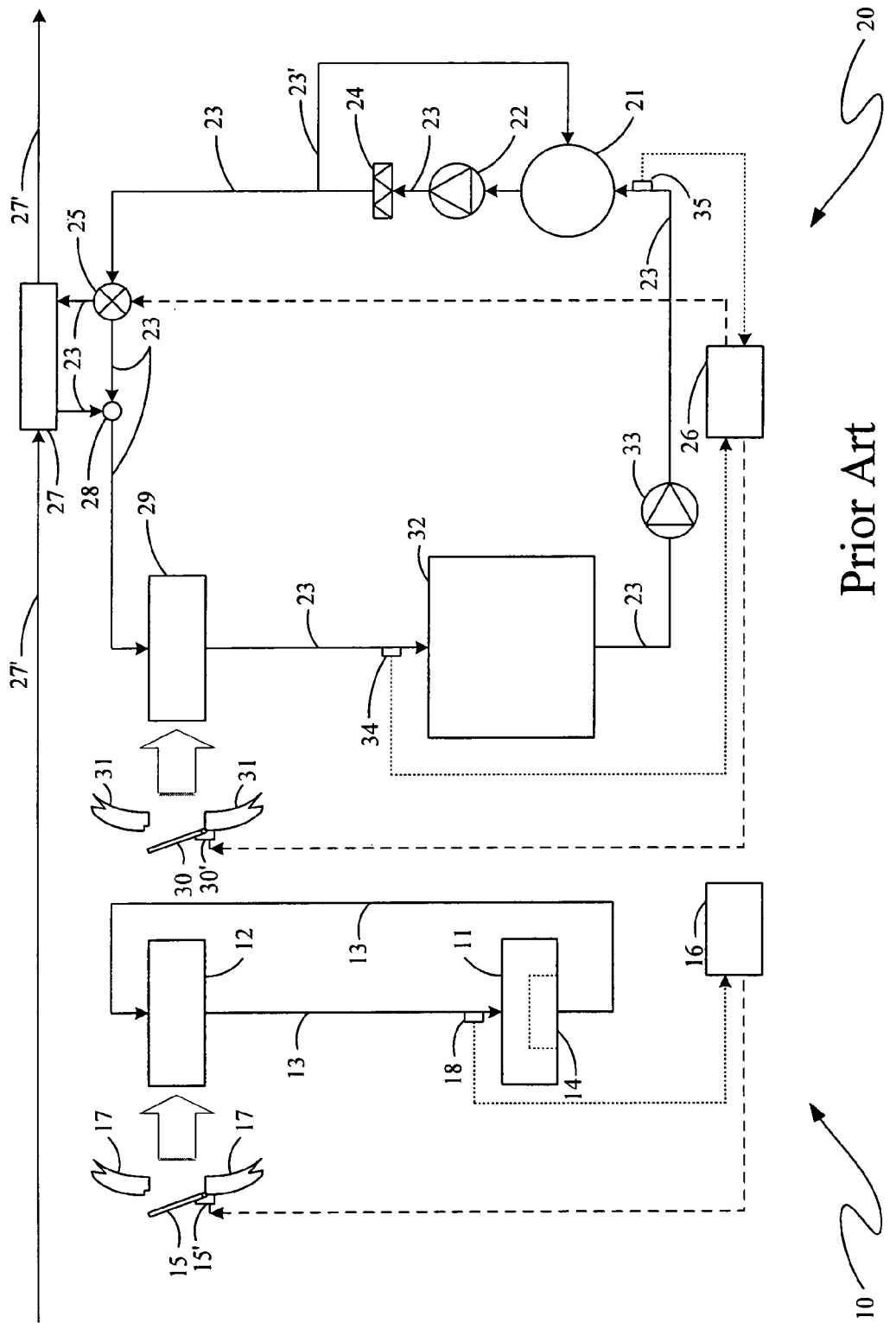
FIG. 1 shows a schematic diagram of an integrated drive electrical generator lubrication system and a turbofan engine lubrication system.

Lubrication systems typically in use currently with turbofan engines and associated integrated drive generator systems are represented in the schematic diagram shown in FIG. 1 where there is a lubrication system for the turbofan engine that is shown entirely separate from the lubrication system for the generator. Thus, on the left is shown a lubrication system, 10, for an integrated drive generator system having therein an electrical generator, 11, with a rotor that is forcibly rotated by the associated turbofan engine, and an air and oil heat exchanger, 12, interconnected to generator 11 with oil conduits, 13, allowing therethrough the circulation of the system lubricant, or the oil, through the moving parts of the generator such as bearings and through the plurality of oil carrying passageways of the exchanger about and between which secondary airstreams from the engine fan can flow, the oil being selectively forced to so circulate by a pump, 14, internal to generator 11.

Air and oil heat exchanger 12 has a moveable flap, 15, controlled by a computer controller, 16, through appropriately operating a motor and associated position sensor device, 15', to limit the fan airstream flow past this exchanger at its location as positioned in a duct, 17. A temperature sensor, 18, senses the temperature of the oil as it enters generator 11 and returns this information to computer 16.

On the right side of FIG. 1 is shown a lubrication system, 20, for a turbofan engine having a lubricant or oil reservoir, 21, for storing quantities of oil not then being circulated through the remainder of the lubrication system out of which a pump, 22, forces oil first through one of a plurality of oil conduits, 23, through a filter, 24, and then through others of conduits 23 first to a bypass valve, 25, and then to the lubricated parts in the remainder of the lubrication system. An exception is any fraction of the oil forced through the suitably dimensioned orifice in a trim conduit, 23', which conveys back to reservoir 21 any oil not accepted through bypass valve 25 that results from overpressure in the oil as generated by pump 22.

The oil exiting filter 24 not entering trim conduit 23' goes under pressure to computer controlled bypass valve 25 by which a computer controller, 26, can direct a selected fraction of this oil flow to be forced through a fuel and oil heat exchanger, 27, to further heat the fuel flowing in a fuel line, 27', in which exchanger 27 is included and to further cool that fraction of the oil provided thereto. The oil flow fraction in exchanger 27, if any, is recombined in a combiner arrangement, 28, with any of the oil exiting filter 24 that computer controller 26 caused to bypass exchanger 27. Exchanger 27 is typically of a relatively small size because of the more efficient heat transfers between liquids due to their greater mass density as compared to the transfer between a liquid and a gas in a air and oil heat exchanger, for example, as a result of the substantially smaller mass density of that gas or gases.

The combined oil from combiner 28 is forced under pressure through oil carrying tubes (not explicitly shown in FIG. 1) of an air cooled heat exchanger, 29. The degree of air cooling of the oil flowing through exchanger 29 due to secondary airsteams from the engine fan flowing past and between those tubes is controlled by the position of a moveable flap, 30, as selected by computer controller 26 through appropriately operating a motor and an associated position sensor device, 30', to control air flow through a duct, 31, in which exchanger 29 is positioned.

The oil emerging from exchanger 29 is then forced through relatively low temperature sensitivity parts, 32, to be lubricated typically including roller bearings, seals and gears. The oil that gathers in the corresponding sump following this lubrication thereby is then returned by a scavenger pump, 33, to reservoir 21. A temperature sensor, 34, senses the temperature of the oil as it proceeds to parts 32, and another temperature sensor, 35, senses the temperature of the oil as it enters reservoir 21, and they both returns their respective information to computer controller 26.

Figure 2:
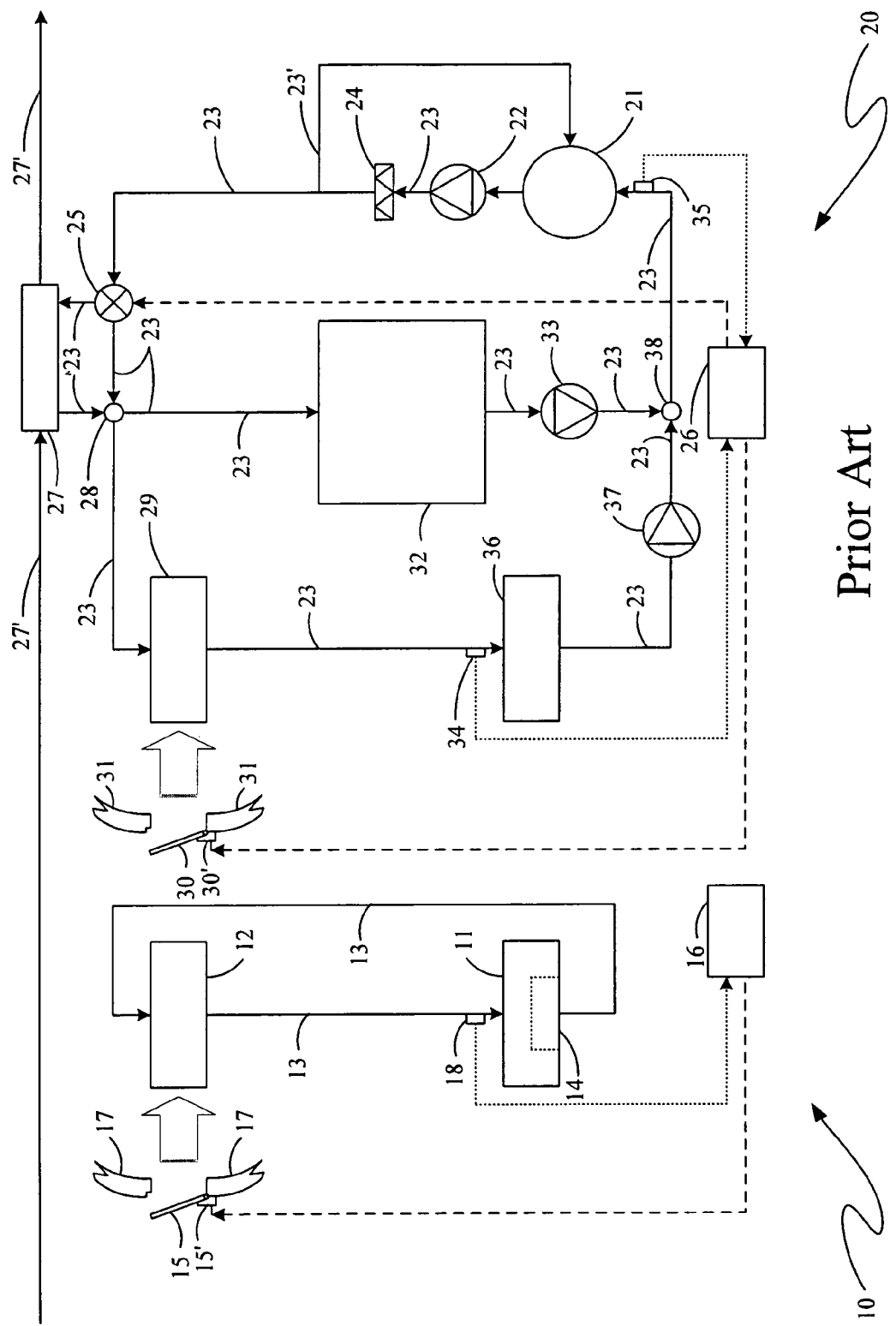
FIG. 2 shows a schematic diagram of an integrated drive electrical generator lubrication system and an alternative turbofan engine lubrication system.

A variation in the typical lubrications systems arrangement shown in FIG. 1 is shown in the schematic diagram of FIG. 2 in which some of higher temperature sensitivity parts, 36, to be lubricated must have the oil providing such lubrication being at a significantly lower temperature than the oil lubricating the other parts 32 having a tolerance for higher temperatures. Such temperature sensitive parts 36 could be, for example, journal bearings for the gears operating the fan in a geared turbofan engine. In this situation, air and oil heat exchanger 29 is positioned in conduits 23 ahead of low maintained temperature parts 36, as is temperature sensor 34, to assure that the oil temperature can be controlled by computer controller 26 to the smaller necessary value and that such control of temperature there will be sufficient to leave the oil lubricating the other parts to be lubricated 32 cool enough for those purposes. A further scavenger pump, 37, is added to return the oil that gathers in the corresponding sump following this lubrication thereby. The return oil pumped by both of scavenger pumps 33 and 37 is combined in a further combiner arrangement, 38, and returned to reservoir 21.

As indicated above, air and oil heat exchangers 12 and 29 must each be capable of providing adequate oil cooling for the most extreme preflight or flight conditions encountered by their respective lubrication systems. That is, they must be large enough to assure that a sufficient part of the cooling engine fan airstream flows over a sufficient amount of lubricating oil flowing through passageways therein per unit time. Typically, however, the extremes of the preflight or flight conditions encountered by air and oil heat exchanger 12 in generator lubrication system 10 is not the same as the extremes of the preflight or flight conditions encountered by air and oil heat exchanger 29 in turbofan engine lubrication system 20.

Typically, for the turbofan engine, the likely most extreme heating increase of the lubricant to be encountered by its lubrication system in relation to the cooling capability of the air flow thereabout occurs in the conditions of the aircraft fuel being, or having become, relatively hot while the aircraft was on the ground followed immediately thereafter by operation at very high altitude so that the heat in the lubricant can not be significantly further transferred to the fuel in the aircraft fuel and oil heat exchanger. In this circumstance, the aircraft takes off with the engine developing high thrust to subsequently reach the top of its climb after the takeoff, and during which climb the engine is generating considerable heat in its lubricant.

At this top of the climb, if the engine thrust is considerably reduced to end such climbing and, thereby, significantly reduce the engine fan secondary airstream used by the engine lubrication system air and oil heat exchanger to cool the lubricant, an extreme in the heating of the engine oil occurs. This is compounded by the cooling there depending on the much lower heat transfer efficiency provided by air cooling due to the relatively small mass density of air. The engine lubrication system at this extreme condition will need to be sufficiently capable to limit the temperature of its lubricant to not exceed some value, typically 225° F. This system capability need to deal this very infrequent operating conditions occurrence thus leaves the engine lubrication system with extra cooling capacity during times the aircraft is on the ground with the engine merely idling during all preflight conditions and during all other flight conditions.

The generator lubrication system, on the other hand, is likely to encounter its most extreme heating increase of its lubricant in relation to the available air cooling capability on the ground on a hot day. The generator in this circumstance will typically supply its greatest load, and generate the most heat in its lubricant in doing so, as the aircraft interior is cooled for example by electrically operated air conditioning and has its lights and instruments also operating to thereby provide some maximum electrical load. In this situation, the engine will be just idling so that there will not be much of an engine fan secondary airstream to be used by the generator lubrication system air and oil heat exchanger to cool the lubricant. Here, too, the lubrication system at this extreme condition will need to limit the temperature of its lubricant to not exceed some value typically 200° F. However, the aircraft taking off greatly increases the engine fan secondary airstream so that, even though the generator heat output will increase somewhat compared to being on the ground with the engine idling, the cooling capacity of the generator air cooled oil and air heat exchanger is increased much more thereby also leaving extra cooling capacity in this lubrication system in this situation.

In most preflight and flight situations both generator lubrication system 10 and engine lubrication system 20 of FIGS. 1 and 2 would be able to have the temperatures of the lubricants used therein kept below their respective limits with relatively small cooling capacities in air and lubricant heat exchangers 12 and 29, respectively, thus allowing use of correspondingly relatively small structural volumes therefor were those the only conditions encountered. But, as indicated above, each of these lubrication systems must instead be sized to be capable of keeping the temperatures of the lubricants therein within those limits in these extreme conditions described therefor above to avoid damage to the generator and engine no matter how seldom such conditions are encountered. Such larger heat exchangers thus necessarily require larger ducts 17 and 31, respectively, which, if kept open to the engine fan secondary airstream, will add significant drag and the corresponding loss in efficiency. Thus, flaps 15 and 30 are used to enable the closing off of those ducts when little cooling is needed from air and lubricant heat exchangers 12 and 29. Nonetheless, drag losses remain through the ducts compounded by the additional losses caused by the larger ducts protruding into the fan airstream, and there is substantial difficulty in finding sufficient volume in the engine nacelle of engine fan bifurcation structure to accommodate such larger exchangers and ducts.

However, the occurrence of the extremes of lubricant heating in the two lubrication systems at different times in preflight and flight situations, and the resultant availability of extra cooling capacity in the opposite system at times of extreme heating of one of these two lubrication systems, allows use of thermally coupled generator lubrication system 10 and engine lubrication system 20 to transfer heat from one to the other when either one or the other is in or near its extreme lubricant heating condition. This other system will not at that time be in or near its extreme lubricant heating condition but will have available therein extra cooling capacity. Hence, if these two lubrication systems are thermally coupled to one another, either of air and lubricant heat exchangers 12 and 29, or both, may be "undersized". That is, each may be sized smaller than necessary for the air and lubricant heat exchangers that would otherwise needed in generator lubrication system 10 and engine lubrication system 20 of FIGS. 1 and 2 if they are required individually to be capable of always maintaining the lubricant in its corresponding system below its temperature limit.

Thus, one of the thermally coupled lubrication systems, served by a smaller exchanger than that which is necessary to be individually capable of keeping the system lubricant always within its temperature limits, can transfer heat occurring in its lubricant at or near its extreme lubricant heating condition, in excess of that which can be dissipated by this smaller exchanger, to the other system to which it is thermally coupled to be dissipated there by the exchanger in this second system. If this second lubrication system can likewise transfer heat in its lubricant at or near its extreme lubricant heating condition, occurring at a different times than do the extremes in the first system, to the first system through that thermal coupling, both of heat exchangers 12 and 29 maybe sized smaller than otherwise necessary in generator lubrication system 10 and engine lubrication system 20 of FIGS. 1 and 2.

Figures 3A, 3B:
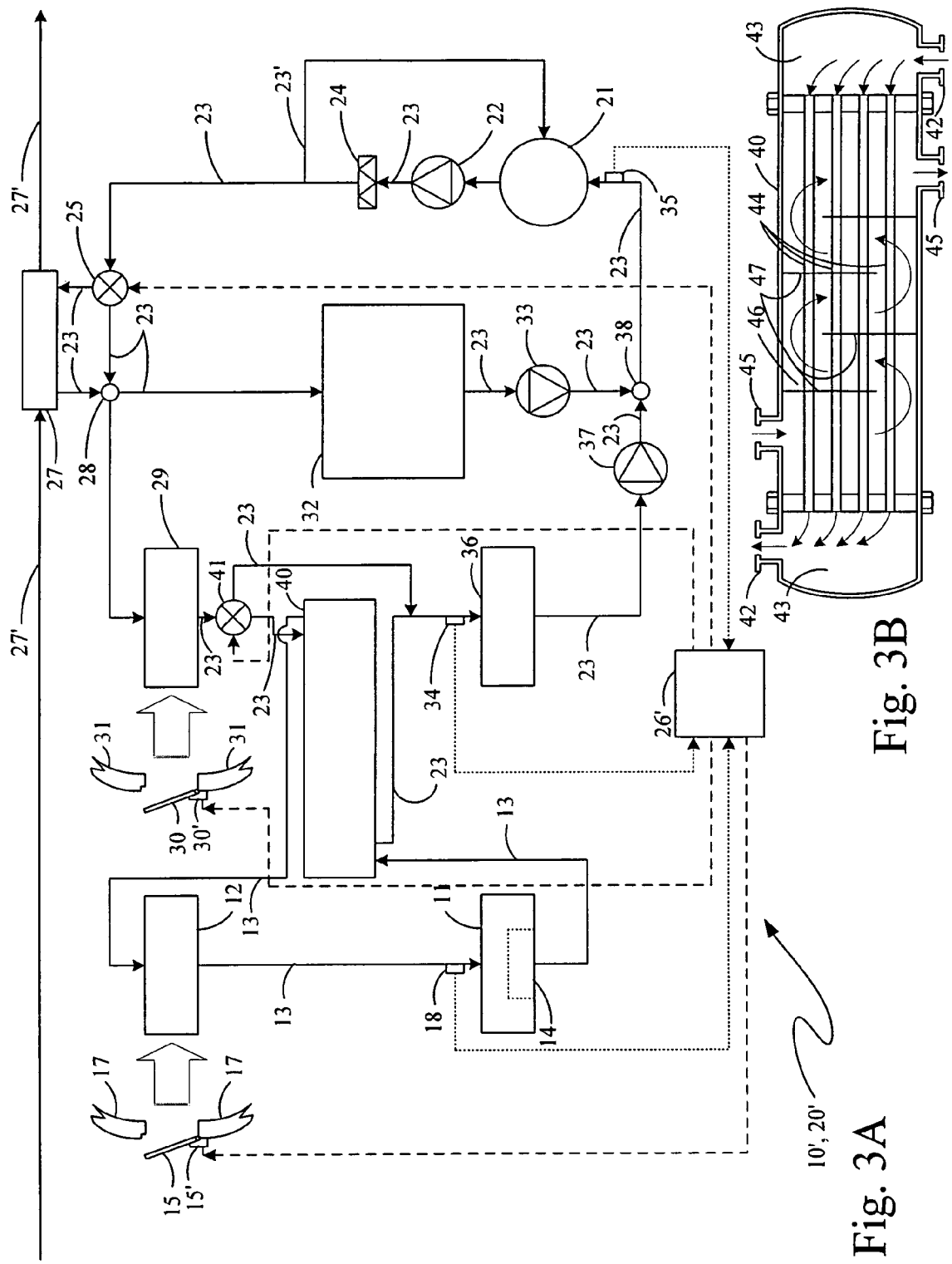
FIGS. 3A and 3B show schematic diagrams of a thermally coupled lubrication system and the coupling device therefor embodying the present invention.

FIG. 3A shows in a schematic diagram a thermally coupled generator and engine lubrication system, 10', 20', that are under operational control of a common computer controller, 26', with this thermal coupling of generator lubrication system 10 and engine lubrication system 20 of FIG. 2 to each other being provided by a shell and tubes lubricant-to-lubricant, i.e. oil-to-oil, heat exchanger, 40. The same numerical designations are used in FIG. 3A as were used in FIG. 2 for the same system components present in each. Selectively eliminating this thermal coupling of these systems to one another that is provided by use of exchanger 40, i.e. decoupling these otherwise separate generator and engine lubrication systems to permit them to be independently operated, is made an available choice by an associated computer controlled bypass valve, 41. This bypass valve allows computer 26' to direct the engine oil from air and oil heat exchanger 29 directly to higher temperature sensitivity parts 36 thus bypassing heat exchanger 40 to thereby prevent heat in the engine oil and heat in the generator oil from being transferred from one to the other.

Heat exchanger 40 is shown in more detail in a representative diagrammatic side view in cross section in FIG. 3B. There, a pair of tube ports, 42, each open to a corresponding one of a pair of outer cavities, 43, having tubes, 44, extending therebetween to carry a lubricating oil from one tube port to the other through the outer cavities. A pair of shell ports, 45, open to an interior cavity, 46, therebetween to carry another lubricating oil from one shell port to the other through the interior cavity while flowing about the outsides of tubes 44 guided by baffles, 47, to thereby permit heat exchange across the walls of those tubes.

In coupled system 10', 20', oil-to-oil heat exchanger 40 receives the hottest oil from pump 14 of generator 12 in which this oil has been heated which then passes through the tubes of that exchanger and on to air and oil heat exchanger 11 in the generator lubrication system portion. Thus, for the generator lubrication system portion, oil therein that has been heated in generator 12 is either further heated or cooled in exchanger 40 (depending on the heat transfer direction arranged between the two lubrication systems) before possibly being significantly cooled in air and oil heat exchanger 11 depending on the position of flap 15.

Similarly, oil-to-oil heat exchanger 40 in coupled system 10', 20' receives oil from air and oil heat exchanger 29 in the engine lubrication system portion through bypass valve 41, assuming that valve has not been directed to divert oil around exchanger 40, which then passes through the shell of exchanger 40 to be transferred on to higher temperature sensitivity parts 36. Hence, for the engine lubrication system portion, oil therein first cooled in fuel cooled oil and fuel heat exchanger 27, if not diverted therearound by bypass valve 25, is then possibly significantly cooled further in air and oil heat exchanger 29, depending on the position of flap 30, and thereafter is either further cooled or heated in exchanger 40 (again depending on the heat transfer direction arranged between the two lubrication systems), if not bypassed by bypass valve 41, before being sent to lubricate higher temperature sensitivity parts 36. This configuration choice in FIG. 3A for coupled system 10', 20' in thermally coupling generator lubrication system 10 and engine lubrication system 20 of FIG. 2 to one another is not unique, as will be shown below, and can depend on many factors including the space available for heat exchangers and their ducts, if any, with respect to their sizes and relative positions in the engine nacelle or the duct bifurcation structure, the presence or not of higher temperature sensitivity parts to be lubricated and the concomitant temperature limit imposed thereby on the corresponding lubricant as well as other temperature limits on the lubricants in use, the efficiencies of the heat exchangers, etc.

Figure 4:
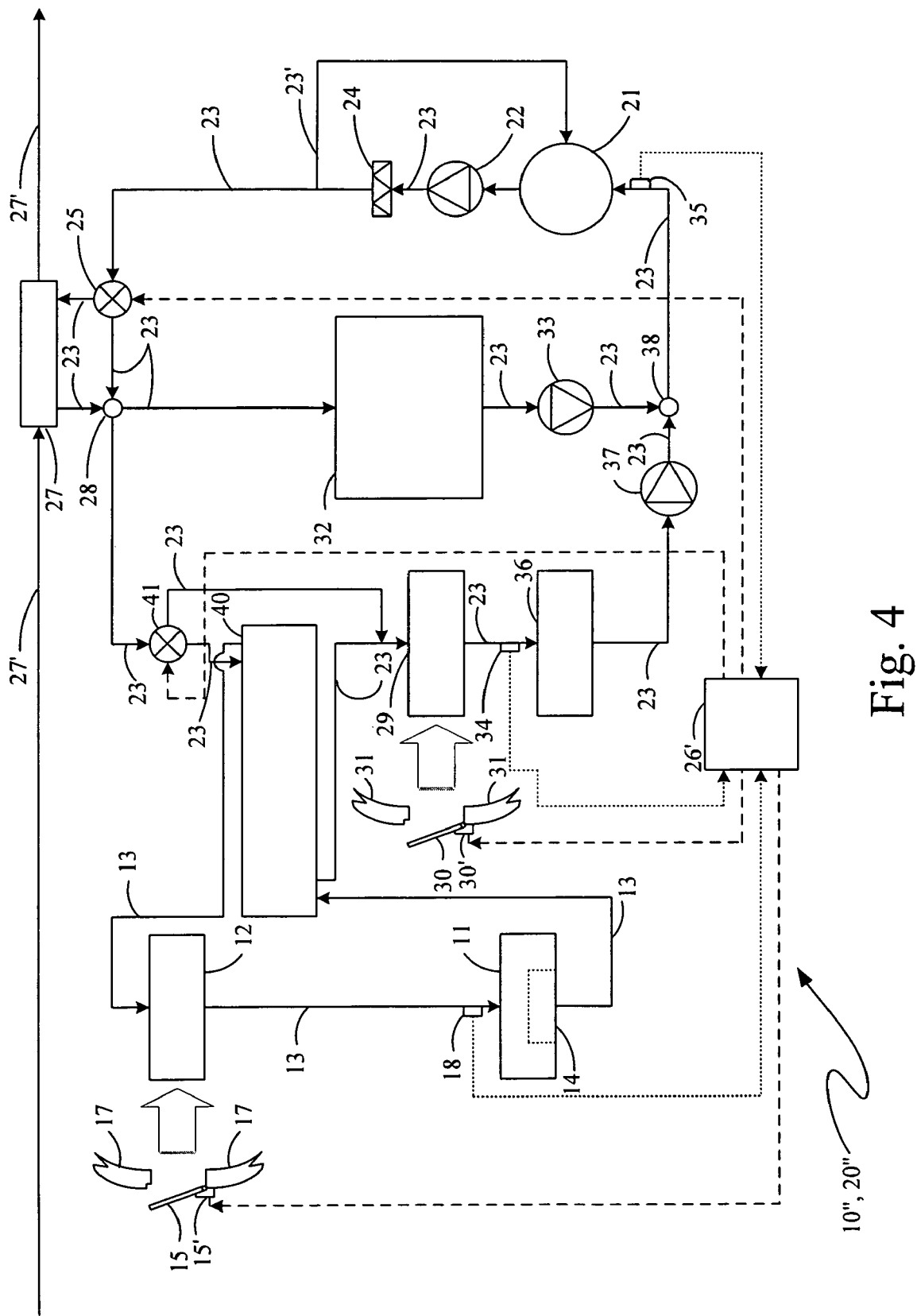
FIG. 4 shows a schematic diagram of an alternative thermally coupled lubrication system embodying the present invention.

An alternative configuration for thermally coupling the generator and engine lubrication systems is coupled system, 10", 20", shown in the schematic diagram of FIG. 4 in which oil-to-oil heat exchanger 40 retains the same position in the generator lubrication system but is now ahead of air and oil heat exchanger 29 in receiving oil in the engine lubrication system. Again, the same numerical designations are used in FIG. 4 as were used in FIGS. 2 and 3A for the same system components present in each.

Exchanger 40 in FIG. 4 receives oil there from oil and fuel heat exchanger 27, if not diverted therearound by bypass valve 25, through combiner arrangement 28 and bypass valve 41, again assuming that valve has not been directed to divert oil around exchanger 40, which then passes through the shell of exchanger 40 to be transferred on to air and oil heat exchanger 29 to thereafter reach higher temperature sensitivity parts 36. If heat is being transferred from the generator lubrication system to the engine lubrication system, this arrangement results in hotter oil going into air and oil heat exchanger 29 which will increase the heat rejected into the fan secondary airstream because of the greater heat transfer efficiency coming about with the resulting greater temperature difference between the oil and the cooling airstream. Heat transfers in the opposite direction results in heat from hotter oil in the engine lubrication system being transferred directly to air and oil heat exchanger 12 in the generator lubrication system.

Figure 5:
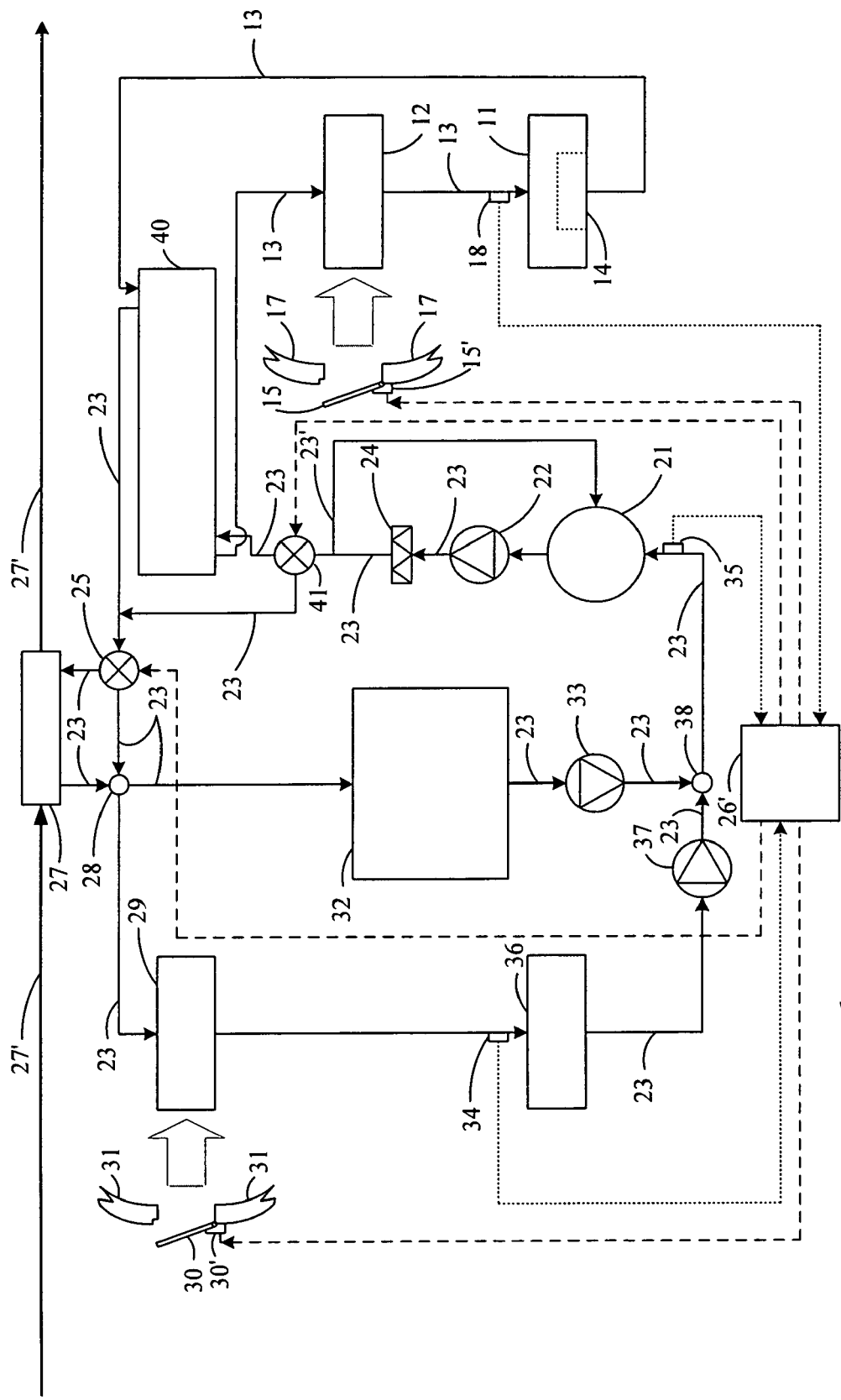
FIG. 5 shows a schematic diagram of an alternative thermally coupled lubrication system embodying the present invention.

Heat transfer efficiency can possibly be further improved by allowing for a possible further increase in the oil temperature before it enters air and oil heat exchanger 29 in another configuration which again leaves oil-to-oil heat exchanger 40 in the same position in the generator lubrication system but now ahead of fuel and oil heat exchanger 27 in receiving oil in the engine lubrication system as shown in a further coupled system, 10''', 20''', presented in schematic diagram form in FIG. 5. Here, too, the same numerical designations are used in FIG. 5 as were used in FIGS. 2, 3A and 4 for the same system components present in each.

Thus, exchanger 40 in FIG. 5 receives oil there from reservoir 21 through pump 22 and filter 24 and then bypass valve 41, once more assuming that valve has not been directed to divert oil around exchanger 40, which then passes through the shell of exchanger 40 to be transferred through oil and fuel heat exchanger 27, or diverted around that exchanger by bypass valve 25, and then through combiner arrangement 28 and air and oil heat exchanger 29 to thereafter reach higher temperature sensitivity parts 36. In those instances when the fuel has accepted all of the heat that should be transferred to it, bypass valve 25 diverts the oil from exchanger 40 to combiner arrangement 28 and then to air and oil heat exchanger 29 without any cooling of that oil by oil and fuel heat exchanger 27 so that heat transferred by the generator lubrication system is added to the heat in the engine oil stored in reservoir 21 that has been provided thereto by parts 32 and 36 and sent to air and oil heat exchanger 29 (a fairly similar result can be obtained in the configuration of FIG. 4 also by using bypass valve 25 to divert oil around exchanger 27). Heat transfers in the opposite direction results in heat from the nearly hottest oil in the engine lubrication system being transferred directly to air and oil heat exchanger 12 in the generator lubrication system.

Figure 6:
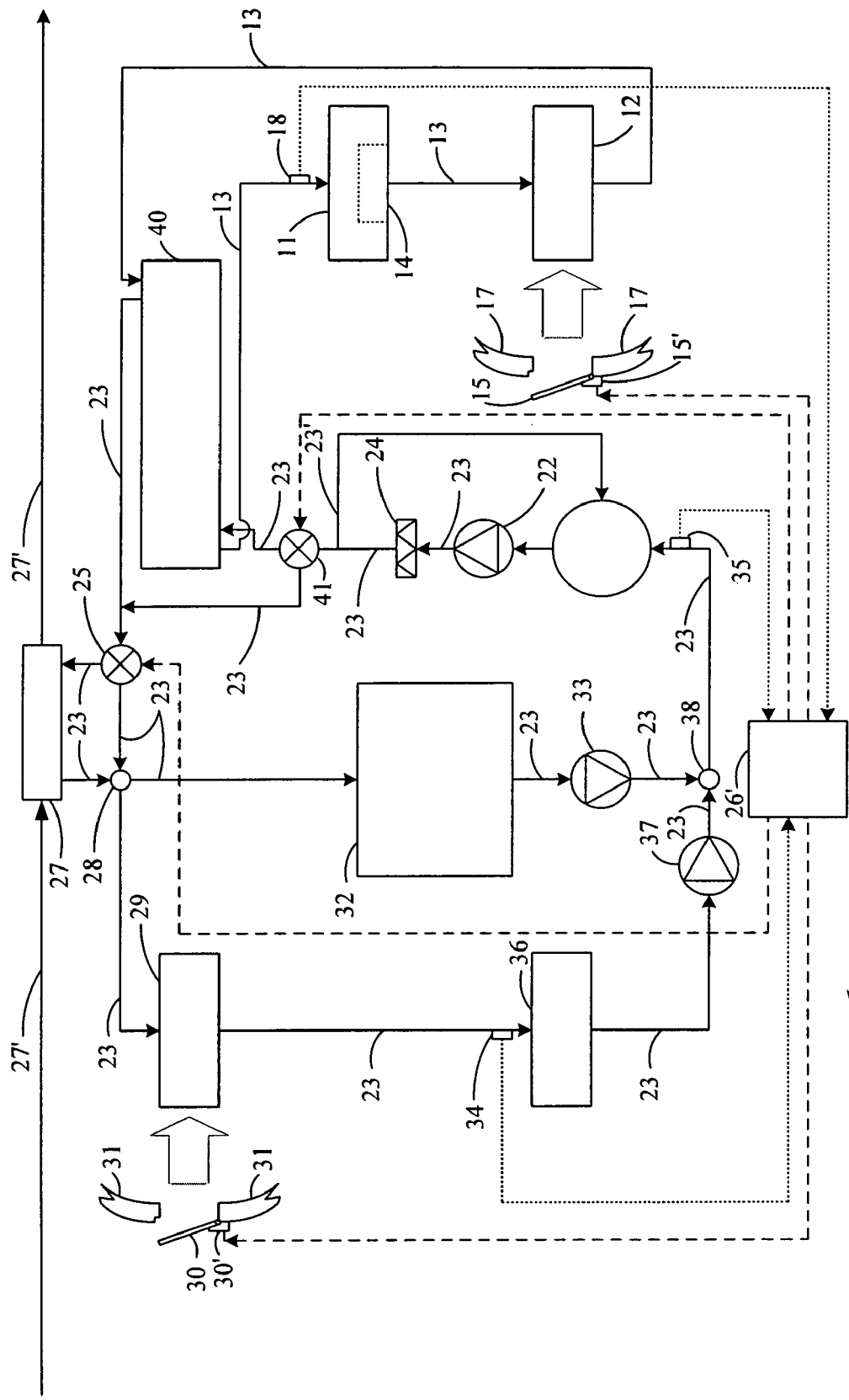
FIG. 6 shows a schematic diagram of an alternative thermally coupled lubrication system embodying the present invention.

Rather than working with the nearly hottest oil in the generator lubrication system as in FIGS. 3A, 4 and 5, a further coupled system, $10^{iv}$, $20^{iv}$, is shown in the schematic diagram of FIG. 6 working with the coolest oil in that system using the same numerical designations there that were used in FIGS. 2, 3A, 4 and 5 for the same system components present in each. That is, coupled system, $10^{iv}$, $20^{iv}$ in FIG. 6 is the same as coupled system 10''', 20''' in FIG. 5 except for oil-to-oil heat exchanger 40 in FIG. 6 receiving oil from air and oil heat exchanger 12 in the generator lubrication system rather than from generator 11 and pump 14. This reduces the heat transferred from the generator lubrication system to the engine lubrication system for heat transfers in that direction. However, for heat transfers in the opposite direction, the heat from the engine lubrication system is added to the heat generated in generator 11 in the oil of the generator lubrication system in the generator so this configuration is likely to be rarely used except in otherwise difficult circumstances.

Figure 7:
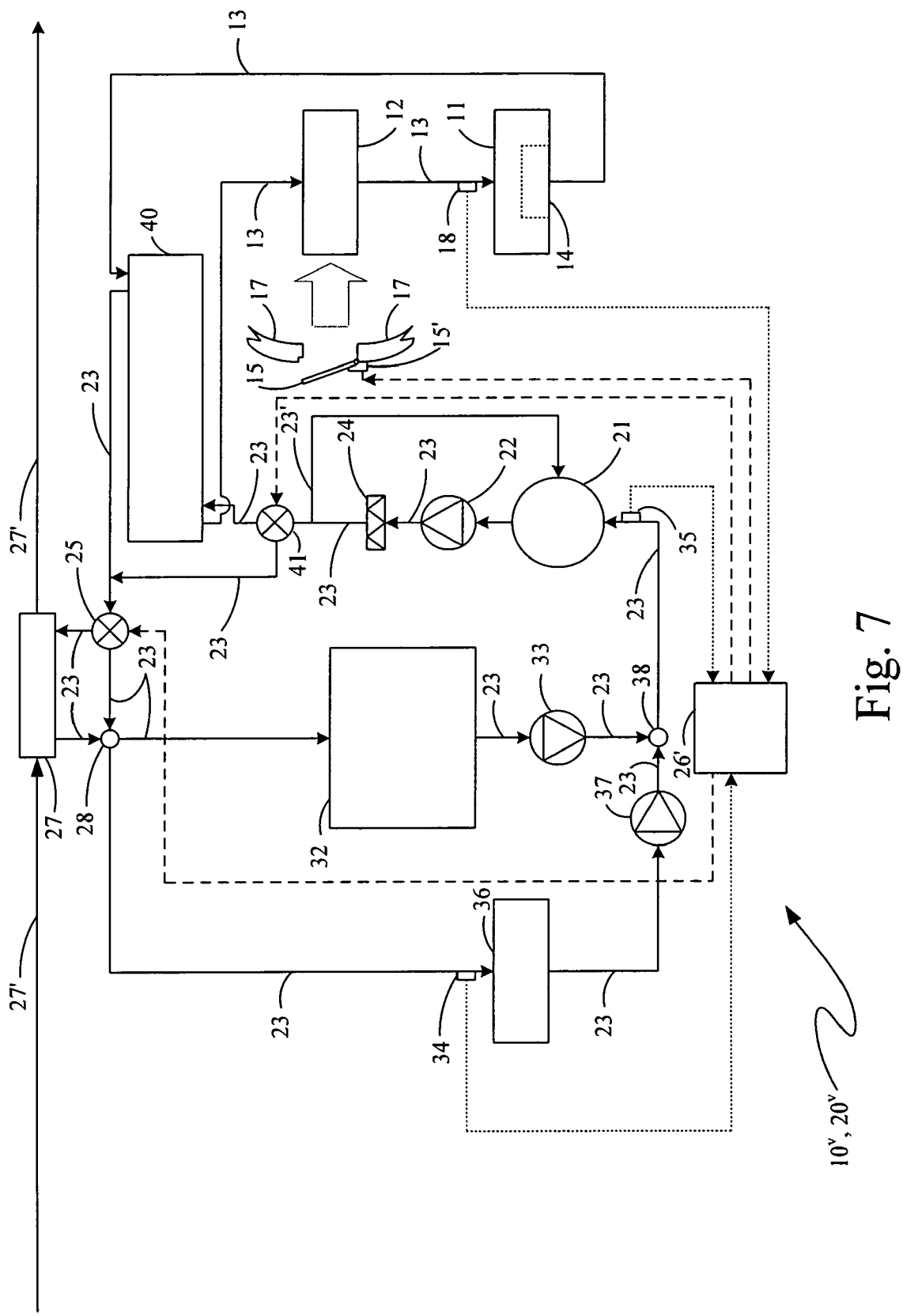
FIG. 7 shows a schematic diagram of an alternative thermally coupled lubrication system embodying the present invention.

In the situation of a relatively small engine and a correspondingly small engine lubrication system, but with an associated integrated drive generator system having substantial extra cooling capacity, an air and oil heat exchanger can be dispensed with altogether in the engine lubrication system as shown in yet another coupled system, $10^v$, $20^v$, in the schematic diagram of FIG. 7. Here, also, the same numerical designations are used in FIG. 7 as were used in FIGS. 2, 3A, 4, 5 and 6 for the same system components present in each. The coupled system of FIG. 7 is the same as coupled system 10''', 20''' of FIG. 5 except for air and oil heat exchanger 29 and associated flap 30 along with flap motor 31' and duct 31 all having been removed. This removal will significantly reduce the volume in the engine that must be devoted to the engine lubrication system even though exchanger 12 will need to at least be sized to be capable of always maintaining the lubricant in its corresponding system below its temperature limit even at its extreme operating condition. Thus, the engine lubrication system heat required to be removed from the oil therein to stay within its oil temperature limit must all be transferred through oil-to-oil heat exchanger 40 to the generator lubrication system to be dissipated through air and oil heat exchanger 12. The alternative of having only air and oil heat exchanger 29 of FIG. 5 present in the coupled system so to allow dispensing with air and oil heat exchanger 12 is an alternative configuration that is also available.

Controlling the operation of any of the foregoing thermally coupled systems in which a generator lubrication system and an engine lubrication system are thermally coupled together, and without any mixing of the lubricants used in either with that of the other, is accomplished through using computer controller 26' to that end which controller may be provided by the Electronic Engine Control or by a separate lubrication systems controller. Computer controller 26' operates based on temperature inputs obtained from temperature sensors 18, 34 and 35, typically provided as thermocouples, and further based on position inputs of airflow flaps (or valves) 15 and 30 obtained from the position sensors in motor and associated position sensor devices 15' and 30'.

Independent measurement of these variables in the generator lubrication system and in the engine lubrication system is necessary since generator heat rejection requirements and engine heat rejection requirements are variables that are independent of the other to some degree even though there is some common dependence between them as a result of having the engine shaft also rotate the generator rotor in the integrated drive electrical power generator system at various rates during engine operation. Although these measurements are taken independently in the two lubrication systems, the controller acts to assure that both lubrication systems operate about or below their temperature set point values under normal operating conditions by controlling the airflows to the air and oil heat exchanger present in one or both systems through its positionings of the corresponding duct flaps and the oil flows heat couplings between them in the oil-to-oil heat exchanger thermally coupling each to the other through its positionings of the bypass valve around that exchanger.

At or near the operating extreme of one of the thermally coupled generator and engine lubrication systems, computer controller 26' will detect, through its sampling of the output values of the sensors in these systems, that the system experiencing such an extreme is exceeding its set point oil temperature value even though the controller has previously forced the corresponding duct flap controlling the airflow over the air and oil heat exchanger in that system to be maximally open to thereby permit maximum airflow past that exchanger. Computer controller 26' then will in turn react by closing bypass valve 41 around oil-to-oil heat exchanger 40 sufficiently further to draw enough heat into the other system not at or near an extreme through heat exchanger 40 from the system operating at or near an extreme. In addition, computer controller 26' will in turn also react by forcing the corresponding duct flap controlling the airflow over the air and oil heat exchanger in the other lubrication system not at or near an operating extreme to open sufficiently further to cool the oil in this system drawing the heat from the system at or near an extreme to oil temperature values sufficiently under its set point oil temperature until the oil temperature value of the lubrication system experiencing an operating extreme, or a near extreme, drops sufficiently to be within a suitably selected temperature range.

The situation of a small engine where the thermally coupled generator and engine lubrication system are cooled by using only one air and oil heat exchanger such as shown, for example, in FIG. 7, is somewhat different. Computer controller 26' will typically use heat exchanger 40 to a) draw heat from the one of the generator and engine lubrication systems not having an air and oil heat exchanger when that system is operating at or near an extreme operating condition, into b) the other system having such an air and oil heat exchanger while controlling its duct flap to provide adequate cooling (and perhaps will need to do so even if the system without an air and oil heat exchanger is operating relatively far from an extreme condition as it may have little opportunity to dissipate heat generated therein even at or near normal operating conditions).

Computer controller 26' may also be able to use heat exchanger 40 to operate in the opposite direction to i) send heat from the one of the generator and engine lubrication systems having therein an air and oil heat exchanger when that system is operating at or near an extreme operating condition, into ii) the other system not having such an air and oil heat exchanger if this latter system nevertheless has a significant capability to dissipate heat generated therein. Any such heat transfers are likely to be limited, however, to being relatively small because of the likely relatively small heat dissipation capability present in the lubrication system without an air and oil heat exchanger.

Thus, the air and oil heat exchanger in the system having same is likely to be sized to at least be capable of providing all of the oil cooling required by the system in which it is provided at its extreme, if not even larger to also provide some oil cooling for the other lubrication system at the time. Typically, the heat transfers through exchanger 40 will be set to satisfy the oil temperature set point value of at least one of these lubrication systems with the oil of the other system to being cooled substantially below its temperature set point value. In this situation, one lubrication will almost always be optimally cooled whereas the other will be overcooled.

Although the present invention has been described with reference to preferred embodiments, workers skilled in the art will recognize that changes may be made in form and detail without departing from the spirit and scope of the invention.

The invention claimed is:
1. A heat exchange system comprising:
first and second subsystems forming first and second respective liquid flow circuits through which first and second respective lubricants are circulatable to provide selected operations in each respective subsystem;
turbine engine parts, portions of which being connected to one of the first and second liquid flow circuits to receive one of the first and second lubricants, respectively;
an airstream heat exchanger connected in the first subsystem so as to have the first lubricant pass therethrough to cool the first lubricant at selectively variable rates in airstreams passing thereby during at least some such uses of the turbine engine parts;
a coupling heat exchanger connected in both the first and second subsystems to have the first and second lubricants pass therethrough to permit one of the first and second subsystems to cool the other;
a subsystem heat exchanger connected in the second subsystem to have both another fluid and the second lubricant pass therethrough;

a control system for operating the coupling heat exchanger to determine the amount of heat exchanged therein between the first and second lubricants; and a bypass valve connected in a selected one of the first and second subsystems across the coupling heat exchanger so as to permit flows of a corresponding one of the first and second lubricants therein to bypass the coupling heat exchanger as selected by the control system, wherein the control system operates the bypass valve to selectively bypass the coupling heat exchanger so as to exchange heat from the first lubricant to the second lubricant to be discharged via the subsystem heat exchanger to the another fluid when temperature of the first lubricant exceeds a threshold, and wherein the control system operates the bypass valve to selectively bypass the coupling heat exchanger so as to exchange heat from the second lubricant to the first lubricant to be discharged via the airstream heat exchanger to the airstreams when temperature of the second lubricant exceeds a threshold.

2. The system of claim 1 further comprising the airstream heat exchanger being mounted in a turbine engine fan duct with portions of the airstreams being forced into this turbine engine fan duct during at least some such uses of the turbine engine parts.

3. The system of claim 2 further comprising a moveable flap and a flap actuator which can force the flap to at least in part cover a portion of one end of the turbine engine fan duct as selected by the control system.

4. The system of claim 1 wherein the first subsystem has connected therein, in addition to the airstream cooled heat exchanger and the coupling heat exchanger, a first subsystem pump for forcing a portion of the first lubricant into the turbine engine parts, the coupling heat exchanger being connected in the first subsystem so as to be reached by the first lubricant from a selected one of the turbine engine parts and the pump and so as to pass the first lubricant to reach the airstream heat exchanger before reaching either of the turbine engine parts and the pump.

5. The system of claim 4 further comprising a turbine engine fuel and lubricant heat exchanger having a first passageway therethrough and connected to the first subsystem so as to allow the first lubricant received from a selected one of the turbine engine parts and the pump to pass along a second passageway therethrough before reaching the coupling heat exchanger such that the first lubricant can transfer heat to fuel in this turbine engine fuel and lubricant heat exchanger.

6. The system of claim 4 further comprising a turbine engine fuel and lubricant heat exchanger having a first passageway therethrough and connected to the first subsystem so as to allow the first lubricant received from the coupling heat exchanger to pass along a second passageway therethrough before reaching the airstream cooled heat exchanger such that the first lubricant can transfer heat to fuel passing through the first passageway in this turbine engine fuel and lubricant heat exchanger.

7. The system of claim 1 wherein the first subsystem has connected therein, in addition to the airstream heat exchanger and the coupling heat exchanger, a first subsystem pump for forcing a portion of the first lubricant into turbine engine parts, the coupling heat exchanger being connected in the first subsystem so as to be reached by the first lubricant from the airstream heat exchanger and so as to pass the first lubricant to reach at least a selected one of the turbine engine parts and the pump before reaching the airstream heat exchanger.

8. The system of claim 7 further comprising a turbine engine fuel and lubricant heat exchanger having a first passageway therethrough and connected to the first subsystem so as to allow the first lubricant received from a selected one of the turbine engine parts and the pump to pass along a second passageway therethrough before reaching the airstream heat exchanger such that the first lubricant can transfer heat to fuel passing through the first passageway in this engine fuel and lubricant heat exchanger.

9. The system of claim 1 wherein the airstream heat exchanger is a first airstream heat exchanger, and further comprising a second airstream heat exchanger connected in the second subsystem as the subsystem heat exchanger so as to have the second lubricant pass therethrough to cool the second lubricant at selectively variable rates in the airstreams passing thereby during at least some such uses of the turbine engine parts.

10. The system of claim 9 wherein the first and second airstream heat exchangers are each mounted in a corresponding turbine engine fan duct with portions of the airstreams being forced into these turbine engine fan ducts during at least some such uses of the turbine engine parts, and further comprising a moveable flap and a flap actuator for each of these turbine engine fan ducts which flap actuator can force the corresponding flap to at least in part cover a portion of one end of the corresponding turbine engine fan duct.

11. The system of claim 9 wherein the first subsystem has connected therein, in addition to the first airstream heat exchanger and the coupling heat exchanger, a first subsystem pump for forcing a portion of the first lubricant into the turbine engine parts, the coupling heat exchanger being connected in the first subsystem so as to be reached by the first lubricant from a selected one of the turbine engine parts and the pump and so as to pass the first lubricant to reach the first airstream heat exchanger before reaching either of the turbine engine parts and the pump.

12. The system of claim 11 further comprising a turbine engine fuel and lubricant heat exchanger having a first passageway therethrough and connected to the first subsystem so as to allow the first lubricant received from a selected one of the turbine engine parts and the pump to pass along a second passageway therethrough before reaching the coupling heat exchanger such that the first lubricant can transfer heat to fuel passing through the first passageway in this turbine engine fuel and lubricant heat exchanger.

13. The system of claim 11 further comprising a turbine engine fuel and lubricant heat exchanger having a first passageway therethrough and connected to the first subsystem so as to allow the first lubricant received from the coupling heat exchanger to pass along a second passageway therethrough before reaching the airstream cooled heat exchanger such that the first lubricant can transfer heat to fuel passing through the first passageway in this turbine engine fuel and lubricant heat exchanger.

14. The system of claim 13 wherein the second subsystem has connected therein, in addition to the second airstream heat exchanger and the coupling heat exchanger, a second subsystem pump for forcing a portion of the second lubricant into an electrical generator, the coupling heat exchanger being connected in the second subsystem so as to be reached by the second lubricant from the second airstream heat exchanger and so as to pass the second lubricant to reach at least a selected one of the electrical generator and the second subsystem pump before reaching the second airstream heat exchanger.

15. The system of claim 13 wherein the second subsystem has connected therein, in addition to the second airstream heat exchanger and the coupling heat exchanger, a second subsystem pump for forcing a portion of the second lubricant into an electrical generator, the coupling heat exchanger being connected in the second subsystem so as to be reached by the second lubricant from a selected one of the turbine engine parts and the second subsystem pump and so as to pass the second lubricant to reach the second airstream heat exchanger before reaching either of the electrical generator and the second subsystem pump.

16. The system of claim 9 wherein the first subsystem has connected therein, in addition to the first airstream heat exchanger and the coupling heat exchanger, a first subsystem pump for forcing a portion of the first lubricant into the turbine engine parts, the coupling heat exchanger being connected in the first subsystem so as to be reached by the first lubricant from the airstream heat exchanger and so as to pass the first lubricant to reach at least a selected one of turbine engine parts and the pump before reaching the first airstream heat exchanger.

17. The system of claim 16 further comprising a turbine engine fuel and lubricant heat exchanger having a first passageway therethrough and connected to the first subsystem so as to allow the first lubricant received from a selected one of the turbine engine parts and the pump to pass along a second passageway therethrough before reaching the first airstream heat exchanger such that the first lubricant can transfer heat to the fuel passing through the first passageway in this turbine engine fuel and lubricant heat exchanger.

18. A heat exchange system comprising:
   turbine engine parts;
   an electrical generator;
   an engine lubrication system coupled to the turbine engine parts and comprising:
      a first air and oil heat exchanger;
      a fuel and oil heat exchanger; and
      an engine oil conduit for flowing a first lubricant between the turbine engine, the first air and oil heat exchanger, and the fuel and oil heat exchanger;
   a generator lubrication system coupled to the electrical generator and comprising:
      a second air and oil heat exchanger; and
      a generator oil conduit for flowing a second lubricant between the electrical generator and the second air and oil heat exchanger;
   a coupling heat exchanger connected to both the generator oil conduit and the engine oil conduit for transferring heat between the first and second lubricants;
   a bypass valve connected in a selected one of the engine lubrication system and the generator lubrication system across the coupling heat exchanger so as to selectively permit flows of a corresponding one of the first and second lubricants therein to bypass the coupling heat exchanger; and
   a control system for operating the bypass valve to selectively bypass the coupling heat exchanger so as to exchange heat from the first lubricant to the second lubricant to be discharged via the second air and oil heat exchanger when temperature of the first lubricant exceeds a threshold, and to selectively bypass the coupling heat exchanger so as to exchange heat from the second lubricant to the first lubricant to be discharged via the first air and oil heat exchanger when temperature of the second lubricant exceeds a threshold.

19. The system of claim 18, wherein a fuel line passing through the fuel and oil heat exchanger does not pass through a heat exchanger coupled to the generator lubrication system.

* * * * *

UNITED STATES PATENT AND TRADEMARK OFFICE
CERTIFICATE OF CORRECTION

PATENT NO.        : 8,205,427 B2                                 Page 1 of 1
APPLICATION NO.   : 11/595185
DATED             : June 26, 2012
INVENTOR(S)       : Frederick W. Schwarz and Jorn A. Glahn It is certified that error appears in the above-identified patent and that said Letters Patent is hereby corrected as shown below:

Col. 6, Line 37
  Delete "maybe"
  Insert --may be--

Signed and Sealed this
Twenty-fifth Day of September, 2012

David J. Kappos
*Director of the United States Patent and Trademark Office*